Patented Sept. 10, 1929.

1,727,506

UNITED STATES PATENT OFFICE.

WINFRID HENTRICH, OF WIESDORF-ON-THE-RHINE, GERMANY, ASSIGNOR TO GENERAL ANILINE WORKS, INC., OF NEW YORK, N. Y., A CORPORATION OF DELAWARE.

CARBOXYLATED N-ω-AMINO-ALKYLAMINONAPHTHALENES.

No Drawing. Application filed September 10, 1927, Serial No. 218,862, and in Germany October 23, 1926.

The present invention relates to amino-alkylaminonaphthalene-carboxylic acids being substituted in the two ortho positions to the aminoalkylamino group by hydrogen atoms and to a process of preparing the same.

In further development of the process described in the U. S. Patent No. 1,543,569 we have found that the hitherto unknown aminoalkylaminonaphthalene-carboxylic acids being substituted in the two ortho positions to the amino-alkylamino group by hydrogen atoms are obtainable by causing an aliphatic diamine to act in the presence of a soluble salt of sulfurous acid upon a hydroxy- or amino-naphthalene-carboxylic acid being substituted in the two ortho positions to the hydroxyl- or amino group by two hydrogen atoms.

Our new compounds are valuable intermediate products, for example for the manufacture of dyestuffs. They are generally colorless crystalline powders generally difficultly soluble in water, soluble in alkalies e. g. a sodium carbonate solution, these solutions exhibiting fluorescence. They can be coupled with diazo products forming azo dyes.

The invention is illustrated by the following examples, in which the particular proportions and the mode of working can be varied within wide limits.

*Example 1.*—38 parts by weight of 2-hydroxynaphthalene-6-carboxylic acid are covered with 300 parts of hot water, 25 parts by weight of ethylene diamine hydrate are added, solution resulting. 400 parts by volume of a solution of sodium bisulfite of 40° Bé. are then added with stirring when part of the naphthol carboxylic acid is again precipitated in a finely divided state. The reaction mixture is now heated to boiling for several hours under reflux with stirring, when first of all the whole of the precipitate redissolves. Soon afterwards the new N-ω-amino-ethyl-2-aminonaphthalene-6-carboxylic acid commences to separate in the form of a thick white, crystalline precipitate. When this ceases to increase in quantity, the whole is allowed to cool and is filtered. The filtrate only contains traces of the condensation product. The precipitate is stirred up with 500 parts by volume of hot water. The whole is then heated to boiling and a 20 per cent hydrochloric acid is added until acid reaction to Congo paper persists and all the sulfurous acid has been evolved. The excess hydrochloric acid is then neutralized with sodium acetate solution and when cooled the whole is filtered and worked up in the usual manner.

N - ω - aminoethyl-2-aminonaphthalene - 6 - carboxylic acid, having most probably the formula

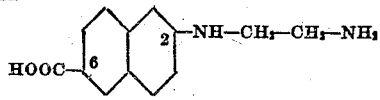

may be crystallized from a large volume of alcohol and obtained in the form of fine matted small needles which dissolve in water with difficulty. The new acid dissolves in a large volume of warm strong hydrochloric acid; the hydrochloride also crystallizes as matted needles. N-ω-aminoethyl-2-aminonaphthalene-6-carboxylic acid dissolves easily in hot dilute sodium carbonate solution or caustic soda solution. The resulting sodium salt can be salted out; the alkaline solutions or suspensions exhibit a blue-violet fluorescence. The new compound reacts with nitrous acid, the solutions being coloured weakly yellow. When N-ω-aminoethyl-2-aminonaphthalene-6-carboxylic acid is heated to 270° C. its colour becomes somewhat more yellow, but no sharp melting point could be observed. The new acid couples immediately with diazotized 4-nitro-1-aminobenzene-2-sulfonic acid in an acid medium with the formation of a deep blue violet colouration.

Other hydroxy or aminonaphthalene carboxylic acids, (provided that they do not contain the hydroxylic or amino groups in the ortho position to the carboxylic group), react in exactly the same manner.

When 2-aminonaphthalene-6-carboxylic acid is used in the above example N-ω-aminoethyl-2-aminonaphthalene-6-carboxylic acid is likewise obtained. The process may also be carried out by treating the 2-hydroxy or 2-aminonaphthalene-6-carboxylic acid first with sulfite and then with the ethylene diamine.

*Example 2.*—N-ω-aminobutyl-2-aminonaphthalene-6-carboxylic acid, having the formula

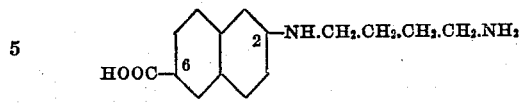

is easily obtained in good yield by replacing the 25 parts by weight of ethylene diamine hydrate in Example 1 by 17.6 parts by weight of 1.4-butylene diamine (100%) otherwise using the same quantities and following the same conditions of working. This acid is almost insoluble even in hot water. It is a colourless powder and crystallizes from a large volume of alcohol in small colourless needles. When heated to 270° C. it shows similar properties to the compound described in Example 1.

The alcoholic and alkaline solutions of N-ω-aminobutyl-2-aminonaphthalene-6-carboxylic acid exhibit blue fluorescence. The new acid couples immediately with diazotized 4-nitro-1-aminobenzene-2-sulfonic acid in an acid medium with the formation of a reddish blue dyestuff.

We wish it to be understood that one may use in the processes hereafter claimed as starting materials either naphthylamine-carboxylic acids being substituted in the two ortho positions to the amino group by hydrogen atoms, or naphthol-carboxylic acids being substituted in the two ortho positions to the hydroxyl group by hydrogen atoms.

I claim:—

1. The process which comprises reacting with an aliphatic diamine in the presence of a soluble salt of sulfurous acid upon a naphthol-carboxylic acid being substituted in the two ortho positions to the hydroxyl group by hydrogen atoms.

2. The process which comprises reacting with ethylene-diamine in the presence of a soluble salt of sulfurous acid upon a naphthol-carboxylic acid being substituted in the two ortho positions to the hydroxyl group by hydrogen atoms.

3. The process which comprises reacting with an aliphatic diamine in the presence of a soluble salt of sulfurous acid upon 2-naphthol-6-carboxylic acid.

4. The process which comprises reacting with ethylene-diamine in the presence of a soluble salt of sulfurous acid upon 2-naphthol-6-carboxylic acid.

5. As new products aminoalkylen-aminonaphthalene-carboxylic acids being substituted in the two ortho positions to the aminoalkylen-amino group by hydrogen atoms.

6. As new products the compounds of the general formula:

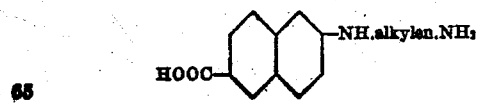

7. As a new product the compound of the general formula:

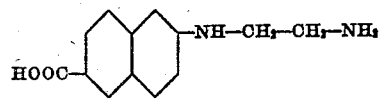

crystallizing from alcohol in the form of small needles, being soluble in dilute caustic soda lye and forming a deep blue-violet coloration when reacted upon in an acid medium with diazotized 4-nitro-1-aminobenzene-2-sulfonic acid.

In testimony whereof I have hereunto set my hand.

WINFRID HENTRICH.